(12) United States Patent
Hosaka et al.

(10) Patent No.: US 8,028,953 B2
(45) Date of Patent: Oct. 4, 2011

(54) ACCELERATING DEVICE

(75) Inventors: Shiro Hosaka, Yokosuka (JP);
Masatada Yamamoto, Tsuru (JP);
Satoshi Matsuda, Kyoto (JP); Akio Yamanaka, Tsuru (JP); Toshihiko Takeo, Nagoya (JP)

(73) Assignee: Central Japan Railway Company, Nagoya-shi (JP)

(*) Notice: Subject to any disclaimer, the term of this patent is extended or adjusted under 35 U.S.C. 154(b) by 708 days.

(21) Appl. No.: 12/089,996

(22) PCT Filed: Oct. 6, 2006

(86) PCT No.: PCT/JP2006/320080
§ 371 (c)(1),
(2), (4) Date: Apr. 11, 2008

(87) PCT Pub. No.: WO2007/043463
PCT Pub. Date: Apr. 19, 2007

(65) Prior Publication Data
US 2009/0134274 A1    May 28, 2009

(30) Foreign Application Priority Data
Oct. 12, 2005   (JP) .................................. 2005-298030

(51) Int. Cl.
*B64F 1/04* (2006.01)
(52) U.S. Cl. ......................... 244/63; 104/282
(58) Field of Classification Search .................... 244/63, 244/904; 104/288, 289, 290, 292, 281, 282, 104/283
See application file for complete search history.

(56) References Cited

U.S. PATENT DOCUMENTS

| | | | | |
|---|---|---|---|---|
| 3,589,300 A | * | 6/1971 | Wipf | 104/281 |
| 3,771,462 A | * | 11/1973 | Barthalon et al. | 104/290 |
| 4,709,883 A | * | 12/1987 | Giuliani et al. | 244/63 |
| 4,795,113 A | * | 1/1989 | Minovitch | 244/63 |
| 7,090,166 B2 | * | 8/2006 | Dennis et al. | 244/63 |
| 7,232,092 B2 | * | 6/2007 | Yamamoto | 244/63 |
| 2005/0082424 A1 | | 4/2005 | Yamamoto | |
| 2005/0115454 A1 | * | 6/2005 | Ramu | 104/281 |
| 2005/0178894 A1 | * | 8/2005 | McGeer et al. | 244/63 |

FOREIGN PATENT DOCUMENTS

| | | |
|---|---|---|
| CN | 1483634 | 3/2004 |
| DE | 3835154 A1 * | 8/1989 |
| GB | 2 211 155 A | 6/1989 |
| JP | 57-130899 | 8/1982 |

(Continued)

OTHER PUBLICATIONS

International Search Report in PCT/JP2006/320080 dated Nov. 28, 2006.

(Continued)

*Primary Examiner* — Benjamin P Lee
(74) *Attorney, Agent, or Firm* — Marshall, Gerstein & Borun LLP

(57) ABSTRACT

Providing an accelerating device capable of safely and efficiently accelerating an aircraft even if the aircraft is a high-speed and heavyweight one.
The accelerating device has a support base for supporting an aircraft so that it does not go backward or levitate and does not pitch; a guide way placed along a predetermined route; guide means for guiding the support base along the guide way; and drive means for driving the support base along the guide way.

15 Claims, 16 Drawing Sheets

FOREIGN PATENT DOCUMENTS

| | | |
|---|---|---|
| JP | 1-147200 | 10/1989 |
| JP | 4-39997 | 4/1992 |
| JP | 5016897 | 1/1993 |
| JP | 6030506 | 2/1994 |
| JP | 6056096 | 3/1994 |
| JP | 8011795 | 1/1996 |
| JP | 2861569 | 12/1998 |
| JP | 2005119589 | 5/2005 |
| RU | 2046070 C1 | 10/1995 |
| RU | 2102292 C1 | 1/1998 |

OTHER PUBLICATIONS

Written Opinion in PCT/JP2006/320080 dated Nov. 26, 2006.
Office Action in corresponding RU2008117689/11 dated Jul. 9, 2010.
First Notice of Reasons for Rejections for Chinese Application No. 2006800378574, dated Jun. 12, 2009.

* cited by examiner

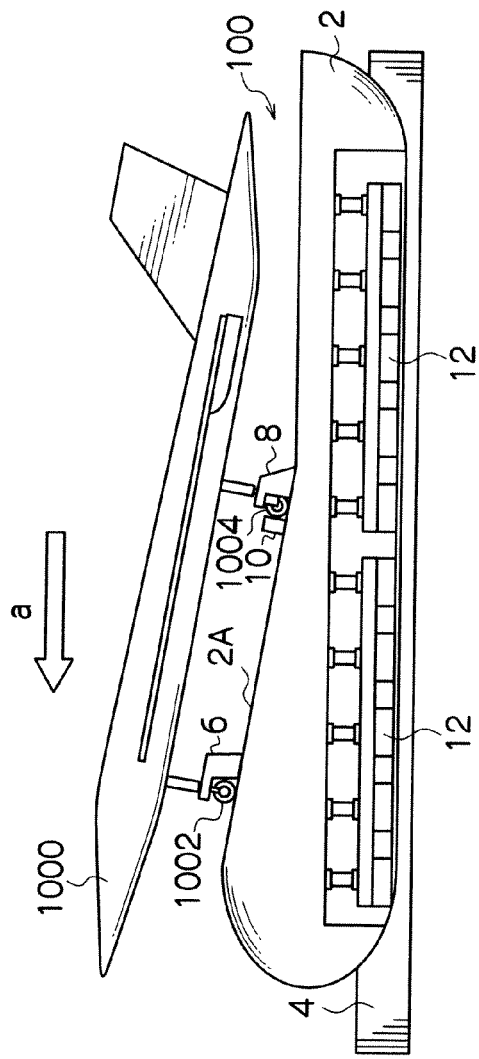
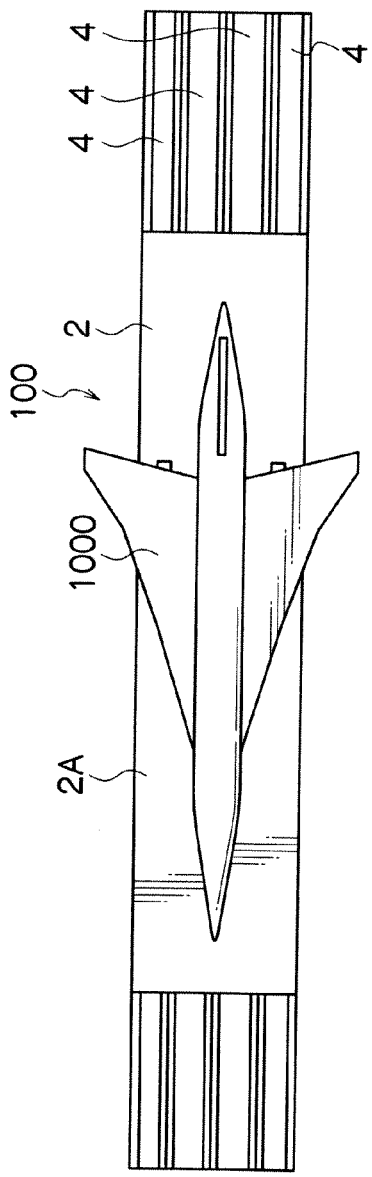
FIG. 1A
FIG. 1B

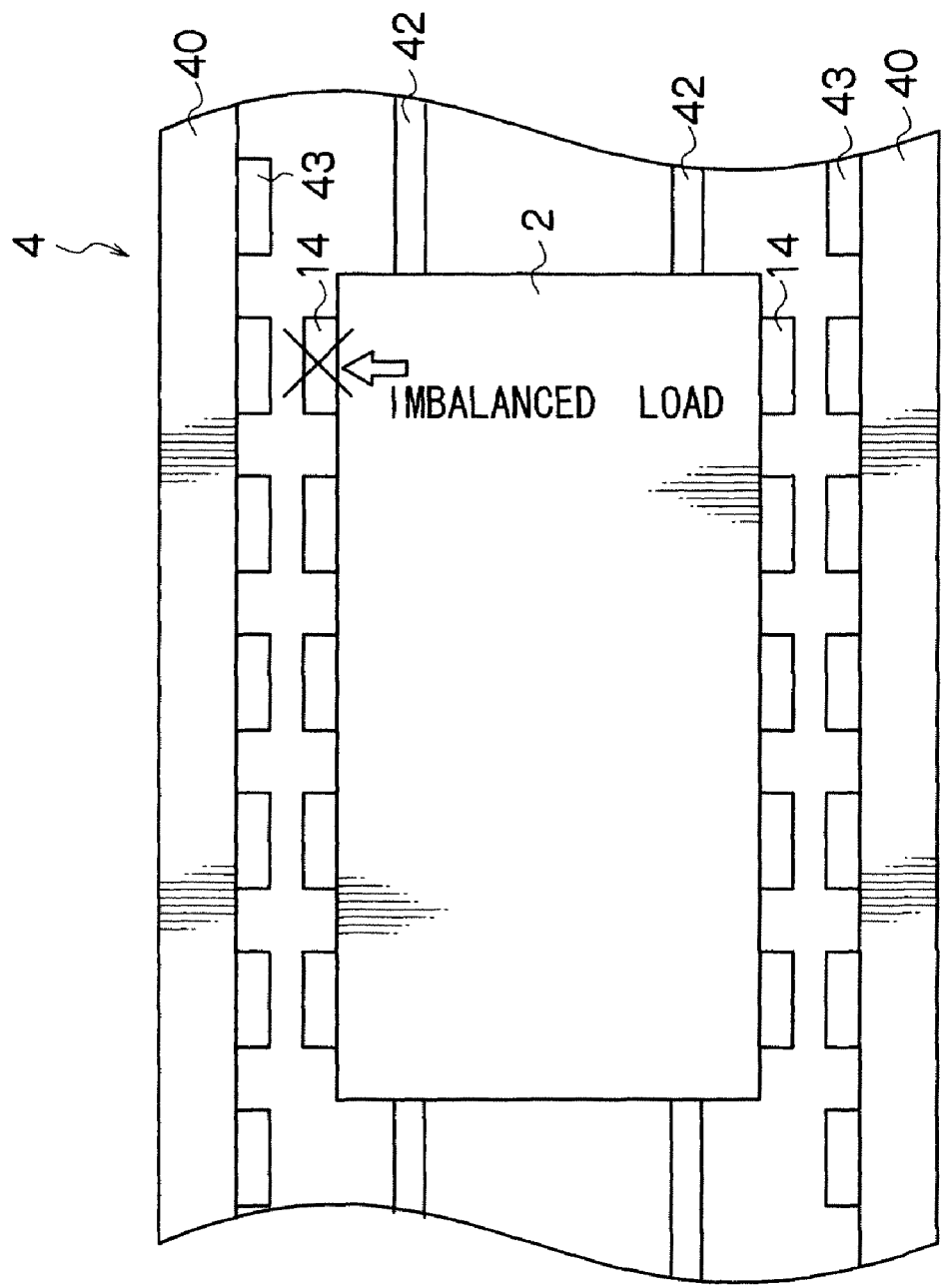

ACCELERATING DEVICE

TECHNICAL FIELD

The present invention relates to an accelerating device, and particularly relates to an accelerating device that is capable of both safely and efficiently accelerating an aircraft, even an aircraft that cannot generate a sufficient lift in a low speed range, such as a supersonic passenger plane.

BACKGROUND ART

A supersonic passenger plane is capable of flight at a high speed greatly exceeding the subsonic passenger planes that are usually employed nowadays. Thus, realization of a supersonic passenger plane is expected principally in terms of rapidity thereof.

However, supersonic passenger planes inherently have greater wing loadings and the like than subsonic passenger planes. Moreover, in order to maintain passenger capacities in consideration of economic factors, plane body weights are larger.

Therefore, because wing loadings are greater, very long runways are necessary for takeoff. Moreover, if engine power is increased to enable takeoff from even slightly shorter runways, plane body weight increases. In addition, fuel consumption of the supersonic passenger plane and airport noise also increases.

As means for solving this, various measures have been considered, such as measures at the plane body such as providing high-lift devices, more aerodynamically refining the plane body and so forth, and also assisting the plane body on the ground at a time of takeoff and so forth.

As a device that assists a plane body on the ground, these have been proposed:

a takeoff assistance device comprising a primary coil of a linear motor that is provided at one of a plane body and a runway, and a secondary coil of the linear motor is provided at the other (patent reference 1); and an accelerating device for a flying body in which a jet engine, which heats a propellant with laser light and provides thrust, and a laser beam incidence portion, which receives illuminated laser light, are provided at a carriage for loading the flying body, and a laser light illumination system is provided partway along a track on which the carriage runs (patent reference 2).

Patent reference 1: The publication of Japanese Patent Application Laid-Open (JP-A) No. 5-16897
Patent reference 2: The publication of Japanese Patent No. 2,861,569

DISCLOSURE OF INVENTION

Problem to be Solved by the Invention

However, a supersonic passenger plane has a large plane body size and weight as mentioned above, and therefore, a takeoff speed is large. Thus, it is necessary to accelerate to a predetermined speed and cause takeoff in a small runway, and also to stop the supersonic passenger plane safely if a malfunction occurs at the supersonic passenger plane. Therefore, it is necessary to restrain the plane body until the supersonic passenger plane is accelerated to a takeoff speed. Further, in a case in which acceleration is halted halfway so as to stop the supersonic passenger plane, it is necessary to keep the plane body thereof reliably restrained until the supersonic passenger plane stops.

The present invention has been made in order to solve the problem described above, and an object is to provide an accelerating device capable of both safely and efficiently accelerating even a high speed and heavy weight aircraft.

Means for Solving the Problem

An invention of claim 1 relates to an accelerating device that accelerates an aircraft so as to cause the aircraft to take off, the accelerating device including: a support base that supports the aircraft so as not to let the aircraft go backward, levitate or pitch during acceleration; a guide way provided along a predetermined path; guide means that guides the support base along the guide way; and drive means that drives the support base along the guide way.

In the above accelerating device, with the aircraft retained on the support base so as not to go backward, levitating from the support base or pitch, the support base runs along the guide way and is accelerated.

Therefore, even an aircraft that is large and lacks lift in a low speed range, such as a supersonic passenger plane, can be accelerated at a sufficient speed for taking off within an existing runway length. In addition, engine output that is required during takeoff can be reduced, and duration of time when the engines are driven at a full output can be shortened. Therefore, airport noise can be reduced. In addition, fuel amount that is to be loaded on the aircraft can be reduced, and a takeoff weight thereof also can be reduced.

Further, if a malfunction occurs at the aircraft side or at the support base side, the aircraft can be halted by decelerating the support base with the drive means, and therefore a high safety can be provided.

An invention of claim 2 relates to the accelerating device of claim 1, wherein the guide means is levitating guide coils disposed on the ground, and the drive means is a linear motor.

On the contrary to a usual rail-rail vehicle wheel running system, the linear motor that is used as the drive means in the above accelerating device has no limitation of maximum acceleration caused by an adhesion coefficient between a rail and vehicle wheels. Therefore, an acceleration rate of the support base can be determined on the basis of a length of the guide way and a takeoff speed of the aircraft. Further, because up-down and left-right guide means are magnetic springs formed by the levitating guide coils, the support base can be guided with no contact, except in a low speed range.

An invention of claim 3 relates to the accelerating device of claim 1 or 2, wherein the support base includes aircraft-restraining means that restrains the aircraft so as not to levitating from the support base or go backward and that is formed such that the aircraft moves freely in a separation direction at a time of separation.

In the above accelerating device, the aircraft is supported by the aircraft-restraining means so as not to go backward, levitate or pitch on the support base. However, the aircraft can freely move in the separation direction at the time of separation. Therefore, when the support base decelerates after reaching the takeoff speed of the aircraft, the aircraft separates forward due to inertia.

Therefore, the aircraft is retained on the support base without going back; lifting up or pitching during acceleration, and additionally, no specific mechanism is necessary for separating the aircraft from the support base after completion of the acceleration.

An invention of claim 4 relates to the accelerating device of claim 3, wherein the aircraft-restraining means restrains the aircraft so as not to move in the separation direction during acceleration.

In the above accelerating device, because the aircraft is restrained so as not to move in the separation direction by the aircraft-restraining means during acceleration, even in a case in which for some reason the acceleration rate falls or the acceleration stops before the speed of the aircraft has not reached a takeoff speed, the aircraft will not separate from the support base. Further, when the support base has reached the takeoff speed of the aircraft, the restraint of the aircraft in the separation direction is released, and therefore the aircraft-restraining means will not be an obstacle to the aircraft separating from the support base.

An invention of claim 5 relates to the accelerating device of claim 3 or 4, wherein the aircraft-restraining means includes forward restraining means that restrains the aircraft at a forward side relative to a center of gravity of the aircraft, and middle portion restraining means that restrains the aircraft at a vicinity of the center of gravity of the aircraft.

In the above accelerating device, because the aircraft is supported on the support base forward of the center of gravity and near to the center of gravity, attitude changes of the aircraft during acceleration can be effectively prevented. Further, loads on both the aircraft and the aircraft-restraining means are smaller.

An invention of claim 6 relates to the accelerating device described in any one of claims 1 to 5, wherein a plurality of the guide ways are provided in parallel with one another, and the guide means supports the support base across the plurality of guide ways.

If vectors of engine thrust of the aircraft supported on the support base and of driving force of the drive means do not match, as in a case in which the aircraft that is being accelerated is a four-engine plane and one of the four engines fails, an unbalancing load in a yawing direction is generated during the acceleration. However, in the above accelerating device, because the support base is supported across the plurality of guide ways by the guide means, in addition to which the support base is guided along the guide ways, the aircraft can be safely stopped in a case in which an unbalancing load in the yawing direction is generated.

An invention of claim 7 relates to the accelerating device described in any one of claims 1 to 6, wherein the drive means brakes the support base by electric braking.

In the above accelerating device, because the drive means brakes the support base by electric braking, deceleration and braking can be implemented with no contact.

An invention of claim 8 relates to the accelerating device of claim 6 or 7, wherein each drive means includes at least two converters that supply electricity.

In the above accelerating device, at each of the drive means, electricity is supplied from a plurality of converters. Therefore, even if one of the converters at a particular drive means fails, the acceleration of the aircraft can continue. Further, if a drive means is divided into a plurality of sections and electricity is supplied to each section from a converter, a section length of the drive means can be shortened and a rise in voltage can be suppressed.

An invention of claim 9 relates to the accelerating device of claim 8, further including, at the drive means, an electricity absorption device that absorbs electricity generated during electric braking.

In the above accelerating device, electricity generated during the electric braking at the drive means is absorbed by the electricity absorption device. Therefore, the electric braking at the drive means can be operated stably. Further, in a case in which the drive means is a linear motor, a large amount of electricity is generated during electric braking, and it is not necessary to return the generated electricity into a power system via power-receiving equipment. Therefore, expanding of the capacity of the power-receiving equipment can be minimized. Further, even in a case in which it is not possible to receive power due to a power supply interruption, the support base and the aircraft can be safely and reliably halted.

An invention of claim 10 relates to the accelerating device of claim 8 or 9, further including an electricity storage device that stores electricity for driving the drive means in advance.

In the above accelerating device, in addition to electricity received by power-receiving equipment, electricity can be released from the electricity storage device and supplied to the drive means. Therefore, for the same capacity of power-receiving equipment, a larger quantity of electricity can be supplied by the drive means. Therefore, this is suitable for accelerating and causing takeoff of a high speed and heavy weight aircraft such as a supersonic passenger plane. Further, for the same quantity of electricity supplied to the drive means, a capacity of the power-receiving equipment may be smaller.

An invention of claim 11 relates to the accelerating device of claim 9, wherein the electricity absorption device is a flywheel.

An invention of claim 12 relates to the accelerating device of claim 9, wherein the flywheel is employed as the electricity storage device.

In the above accelerating devices, electricity generated during electric braking at the drive means is recovered as mechanical rotation of the flywheel. Therefore, by increasing weight and diameter of the flywheel, even large amounts of electricity can be effectively recovered. Further, a lifespan is semi-permanent. Thus, because electricity recovered by the flywheel can be utilized for subsequently accelerating the support base at the drive means, consumption quantities of electric devices of the accelerating device as a whole can be reduced.

Moreover, because the flywheel stores large quantities of electricity as mentioned above, it is suitable as the electricity storage device.

An invention of claim 13 relates to the accelerating device described in any one of claims 1 to 12, wherein the aircraft is separated from the support base at a predetermined angle of attack.

In the above accelerating device, because the aircraft is launched diagonally upward, a running distance of the support base can be shortened. Therefore, length of the guide way can be shortened.

An invention of claim 14 relates to the accelerating device described in any one of claims 1 to 12, wherein the aircraft is separated from the support base horizontally.

In the above accelerating device, because the aircraft is accelerated in a horizontal state, acceleration resistance is smaller than in a case in which the aircraft is retained and accelerated at a specific angle of attack. In addition the load acting on the support base from the aircraft is smaller.

An invention of claim 15 relates to the accelerating device described in any one of claims 1 to 14, wherein the support base accelerates the aircraft and causes the aircraft to take off in one direction along the guide way or in another direction opposite to the one direction.

In the above accelerating device, an acceleration direction of the aircraft can be selected from the one direction and the other direction in accordance with a wind direction.

An invention of claim 16 relates to the accelerating device described in any one of claims 1 to 15, further including a support means that supports the support base from below while the aircraft is being loaded at the support base.

In the above accelerating device, when the aircraft is being loaded on the support base, the support base is supported from below by the support means. Therefore, warping of the support base by the weight of the aircraft and excessive loads being applied to the guide means, the drive means and the like can be prevented. The support means may be, for example, a jack or the like.

Effect of the Invention

According to the present invention as described above, an accelerating device capable of both safely and efficiently accelerating even a high speed and heavy weight aircraft is provided.

BRIEF DESCRIPTION OF THE DRAWINGS

FIG. 1A is a plan view showing a supersonic passenger plane having been loaded at an accelerating device relating to a first embodiment.

FIG. 1B is a side view showing the condition that the supersonic passenger plane has been loaded at the accelerating device relating to the first embodiment.

FIG. 16 is an explanatory view showing one of vehicle coils mounted on the carriage in the accelerating device relating to the first embodiment quenching during running along the guide way.

BEST MODE FOR CARRYING OUT THE INVENTION

1. First Embodiment

Figure 2:
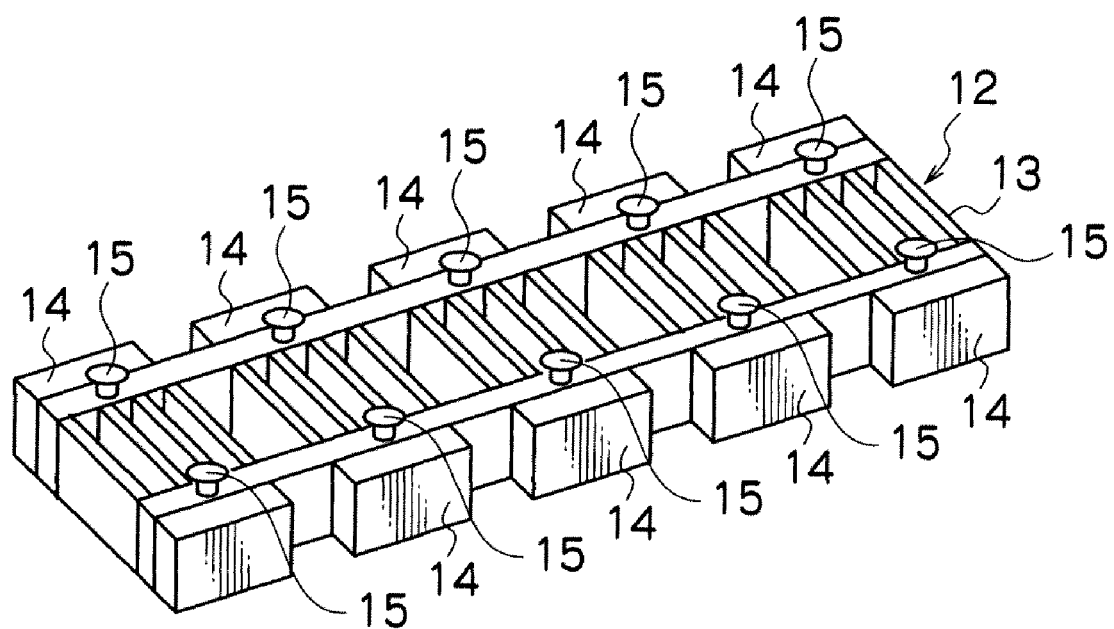
FIG. 2 is a perspective view showing the constitution of a carriage provided at a support base of the accelerating device shown in FIG. 1.

As shown in FIG. 1A and FIG. 1B, an accelerating device 100 relating to the first embodiment is provided with a support base 2 on which a supersonic passenger plane 1000 is loaded and four guide ways 4 corresponding to the guide way of the present invention and guiding the support base 2. An aircraft that can be accelerated at the accelerating device 100 is not limited to the supersonic passenger plane 1000. The accelerating device 100 can be used for a usual non-supersonic passenger plane.

A passenger plane loading portion 2A, which supports the supersonic passenger plane 1000 at a time of acceleration, occupies a front half of the support base 2 along an acceleration direction 'a' of the supersonic passenger plane 1000. The passenger plane loading portion 2A is inclined upward along the acceleration direction 'a' and provided with a front strut stopper 6 and main strut stoppers 8. The front strut stopper 6 and the main strut stoppers 8 correspond to the aircraft-restraining means of the present invention. In particular, the front strut stopper 6 corresponds to the forward restraining means and the main strut stoppers 8 correspond to the middle portion restraining means. The front strut stopper 6 and the main strut stoppers 8 retain, respectively, a front wheel 1002 and main wheels 1004 of the supersonic passenger plane 1000 from a rearward side along the acceleration direction 'a'. In addition, upper end portions of the front strut stopper 6 and the main strut stoppers 8 protrude to forward over the front wheel 1002 and the main wheels 1004, and are formed so as to be able to restrain the front wheel 1002 and main wheels 1004 from the upper side too. The front strut stopper 6 and the main strut stoppers 8 are all formed so as to be retractable into the support base 2.

In front of the main strut stopper 8, a main strut front stopper 10 that restrains the main wheel 1004 from the forward side is provided. The main strut front stopper 10 is also provided so as to be retractable, and protrudes from the passenger plane loading portion 2A as shown in FIG. 1 at the time of acceleration. When acceleration finishes and the supersonic passenger plane 1000 separates from the support base 2, the main strut front stopper 10 is withdrawn into the passenger plane loading portion 2A so as not to be an obstacle to the separation of the supersonic passenger plane 1000.

Inside the support base 2, a total of eight carriages 12 running on the inner sides of the guide ways 4 are provided so as to be arranged in two in a longitudinal direction and in four in a lateral direction. The carriages 12 correspond to the guide means and the drive means of the present invention.

Figure 3:
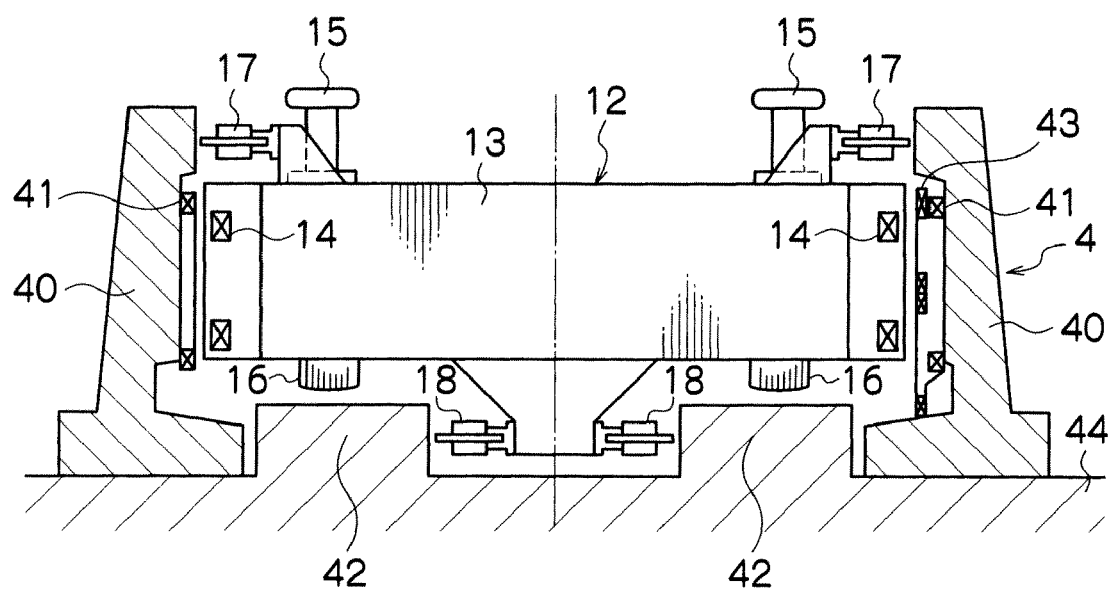
FIG. 3 is a sectional view showing relative positional relationships of the carriage and a guide way of the accelerating device shown in FIG. 1.

As shown in FIG. 2, the carriage 12 is provided with a carriage frame 13 formed in a ladder shape, vehicle coils 14 disposed on each side face of the carriage frame, and pneumatic springs 15 provided at an upper face of the carriage frame 13 for supporting the support base 2. The vehicle coils 14 are super-conductive coils, and a total of ten the vehicle coils 14 are provided, in five on each side face of the carriage frame 13. A total of ten of the pneumatic springs 15 are also provided, in two rows of five thereof. As shown in FIG. 3, tire wheels 16 for low speed operation are provided at a lower face of the carriage frame 13.

At the vicinity of each edge of the upper face of the lower face of the carriage frame 13 and at a central portion of the lower face thereof, stoppers 17 and stoppers 18 for preventing the carriage 12 from contacting the guide way 4 in case when the vehicle coils 14 are quenched are provided, respectively.

Figure 4:
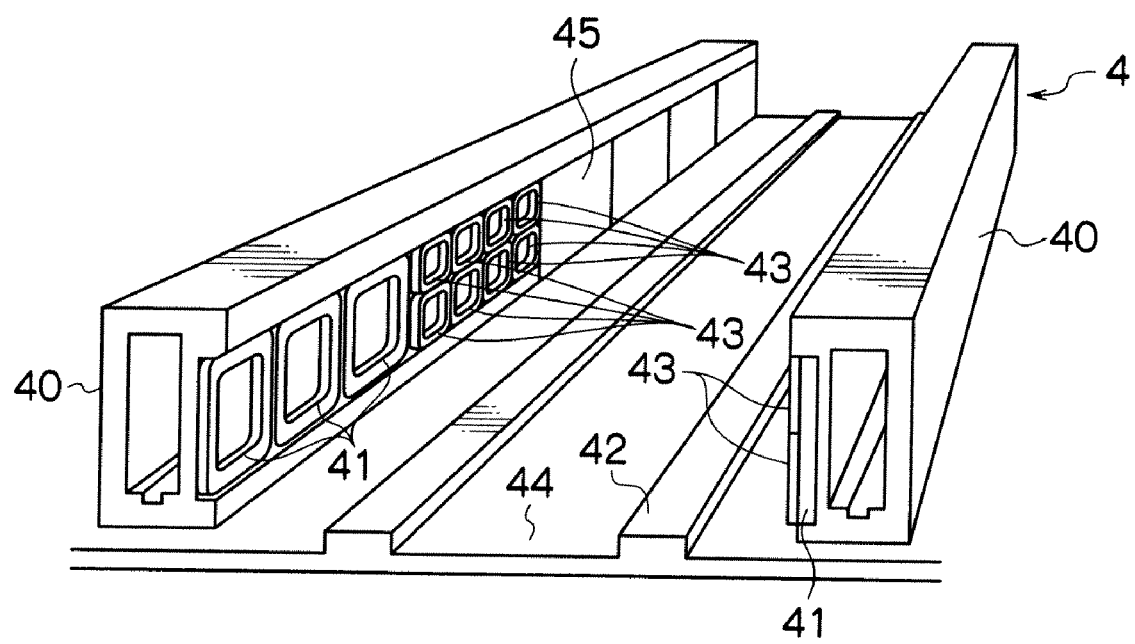
FIG. 4 is a perspective view showing structure of a guide way provided at the accelerating device shown in FIG. 1.

As shown in FIG. 3 and FIG. 4, the guide way 4 comprises a slab portion 44 and guide walls 40. The slab portion 44 is provided with a pair of parallel running paths 42, along which the tire wheels 16 provided at the carriage 12 roll when running at a low speed. The guide walls 40 are provided standing on the slab portion 44 so as to sandwich the running paths 42 therebetween. As shown in the right half of FIG. 3 and shown in FIG. 4, driving coils 41 and levitating guide coils 43 are disposed at inner side faces of the guide walls 40. The levitating guide coils 43 are provided so as to be superposed with the faces of the driving coils 41 facing the walls. Here, at a section on which the support base 2 runs at low speed, for example, a speed of 200 km or less, the carriage 12 does not levitate from the guide way 4, and sufficient running is possible by the tire wheels 16. Thus, as is shown in the left half of FIG. 3, the levitating guide coils 43 are omitted in this region. Here, the driving coils 41 and the levitating guide coils 43 correspond to the drive means and the guide means, respectively, of the present invention.

Figure 5:
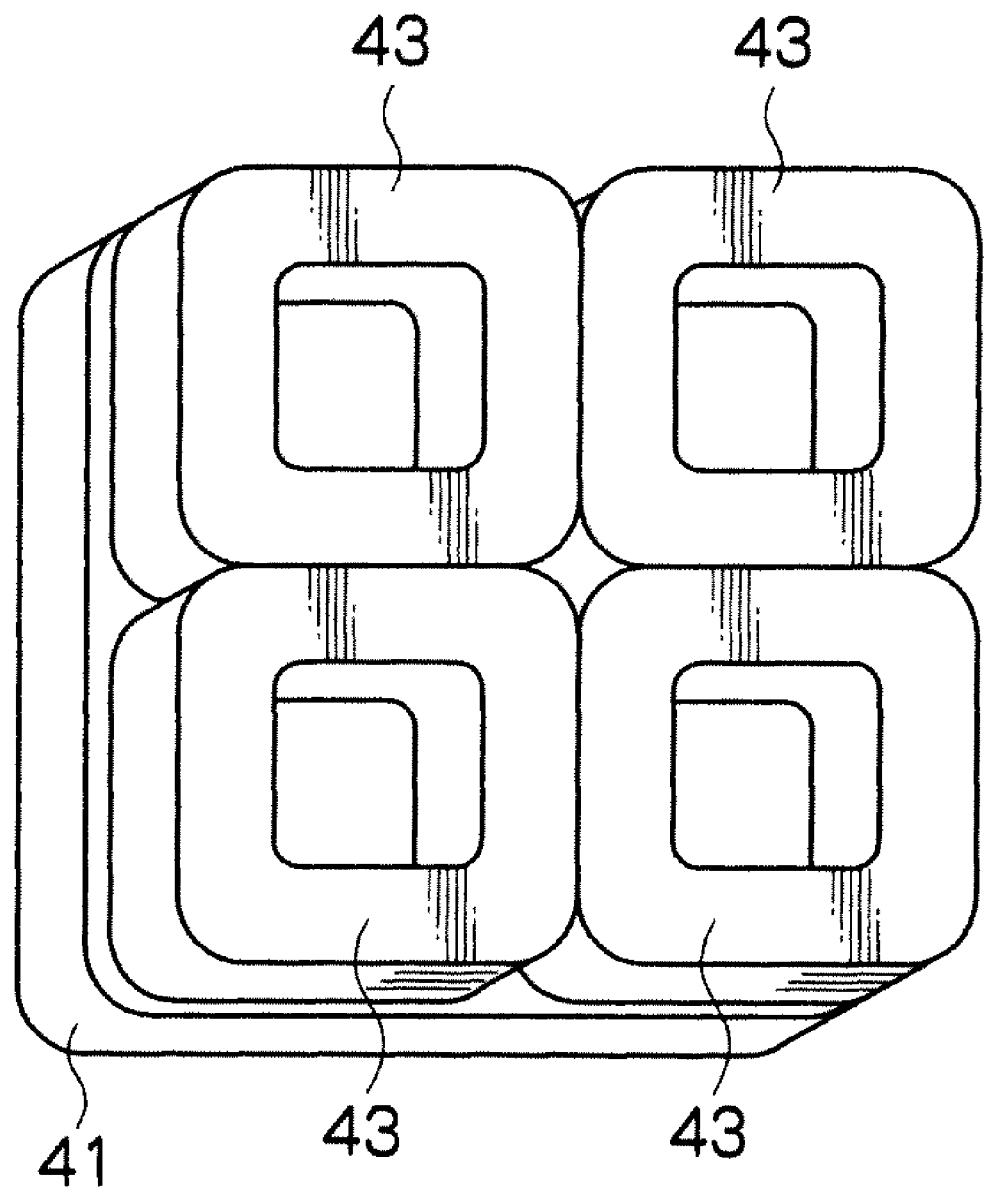
FIG. 5 is a perspective view showing positional relationships and shapes of levitating guide coils and a driving coil of the guide way provided at the accelerating device shown in FIG. 1.

As shown in FIG. 4 and FIG. 5, the driving coils 41 are coils in which conductive wires are wound in a frame-like shape. The levitating guide coils 43 have a constitution of combining four frame-shaped coils, each of which is formed by winding wires in the same direction, for example, an anti-clockwise direction, into the shape of the Chinese letter of 'rice crop field'. The levitating guide coils 43 cause buoyancy generated by electromagnetic interaction with the vehicle coils 14 provided at the carriage frame 13 to act onto the carriage 12, and thus cause the support base 2 to levitate.

Figure 6:
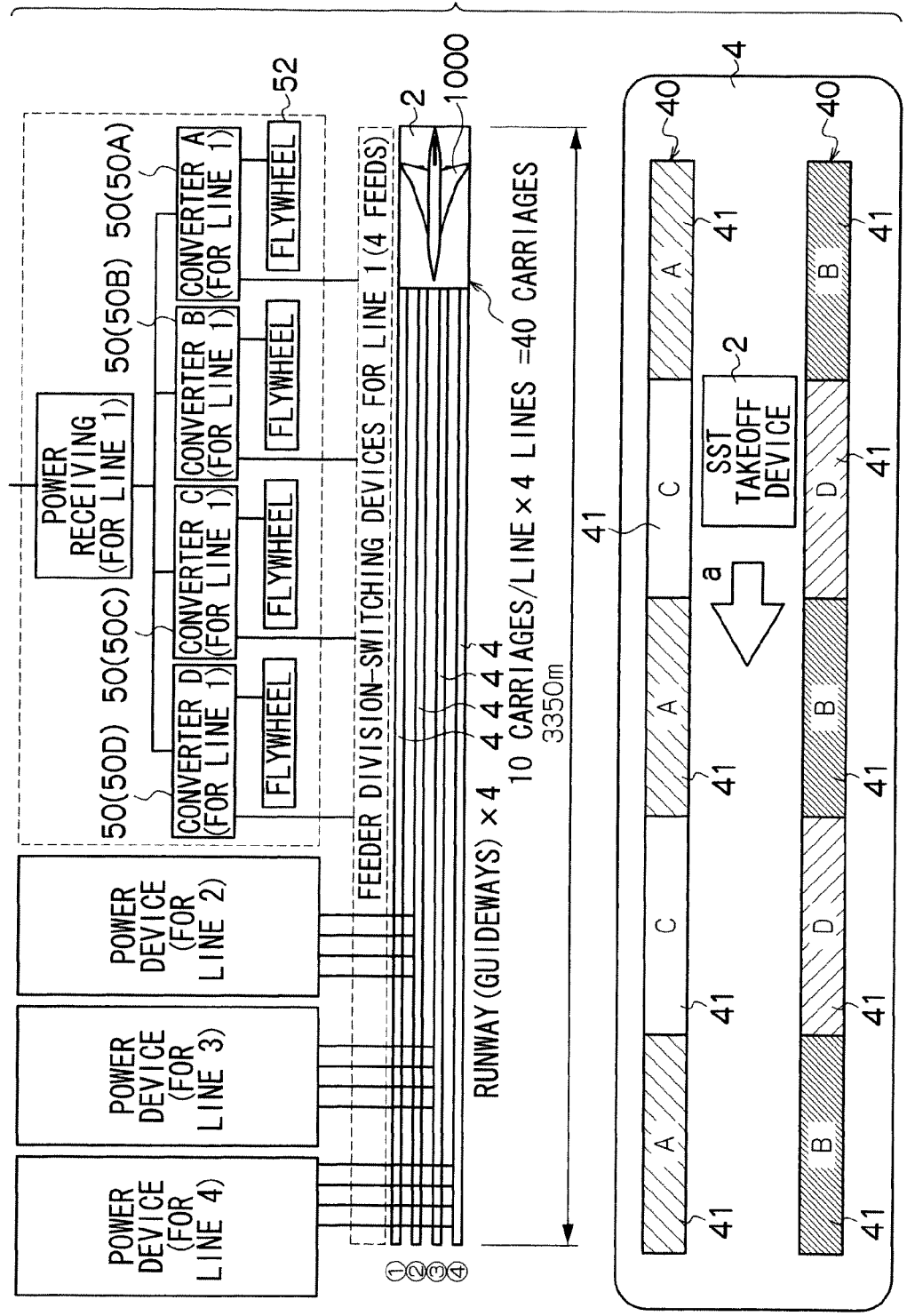
FIG. 6 is an explanatory view showing a feeding system of the accelerating device shown in FIG. 1.

At each of the guide ways 4, as shown in FIG. 6, AC electricity is supplied to the driving coils 41 from four converters 50 that are converters 50A, 50B, 50C and 50D, and the support base 2 is driven.

As shown in FIG. 6, at one of the pair of guide walls 40, the driving coils 41 are alternatingly divided into sections A and sections C. The driving coils 41 of the sections A and the driving coils 41 of the sections C are fed by the converter 50A and the converter 50C, respectively.

At the other of the guide walls 40, the driving coils 41 are alternatingly divided into sections B and sections D. The driving coils 41 of the sections B and the driving coils 41 of the sections D are fed by the converter 50B and the converter 50D, respectively.

Therefore, even if any one of the converters 50A, 50B, 50C or 50D fails, normal operation can be continued.

Figure 7:
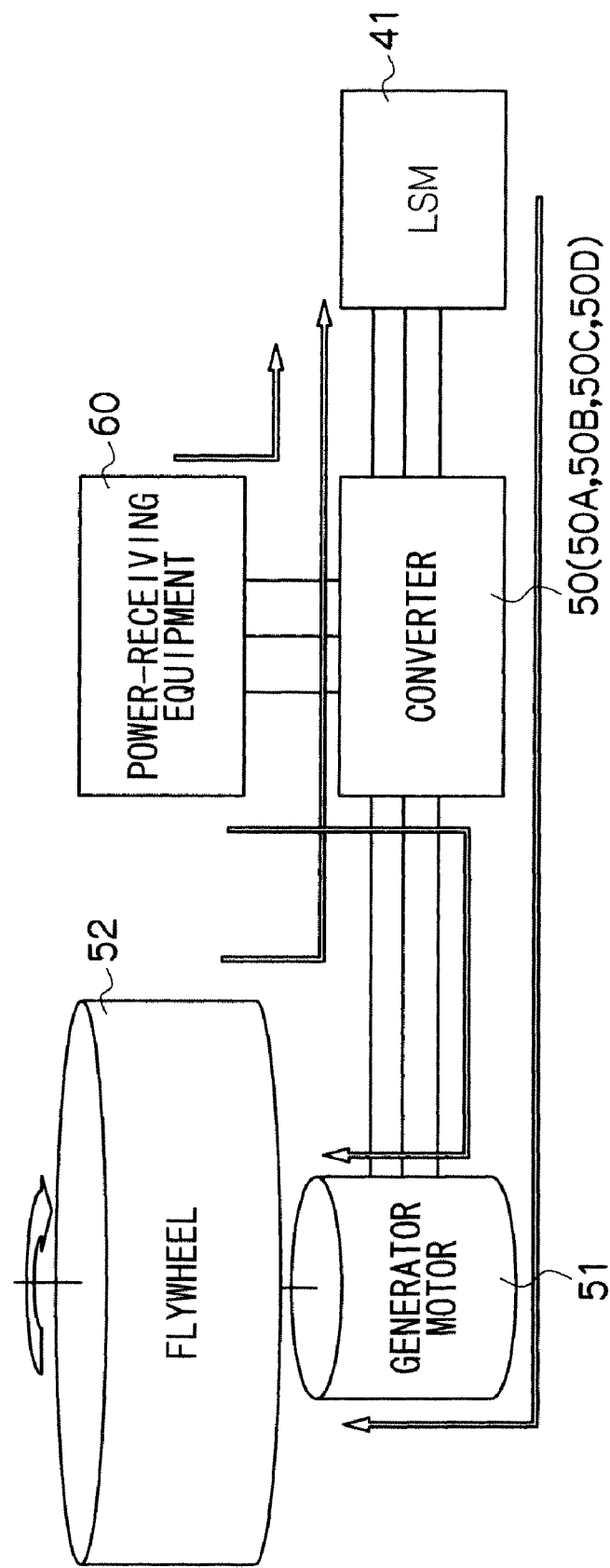
FIG. 7 is a schematic view showing structure of an electricity converter and peripherals thereof in the feeding system shown in FIG. 6.

As shown in FIG. 7, generator motors 51 rotating flywheels 52 are connected to the converters 50A, 50B, 50C and 50D (hereinafter, referred to 'the converters 50'). The flywheels 52 and the generator motors 51 correspond to the electricity absorption device of the present invention. Here, an SMES or the like can alternatively be employed as the electricity absorption device. When electric braking is applied to the carriages 12, the driving coils 41 operate as generator coils, alternating current that is generated as a result is converted to alternating current of a predetermined frequency by the converters 50, and the generator motors 51 are driven and the flywheels 52 rotate. When the carriages 12 is accelerated by the driving coils 41, alternating current that is generated by the generator motors 51 rotating due to inertia of the flywheels 52 is supplied to the converters 50, in addition to the three-phase alternating current from power-receiving equipment 60.

Here, if the output of the driving coils 41 is small, capacitors, superconductor coils, lithium ion batteries or the like may be employed as the electricity absorption device instead of the combination of the generator motor 51 and the flywheel 52.

Below, a procedure for accelerating the supersonic passenger plane 1000 with the accelerating device 100 will be described.

Figure 8:
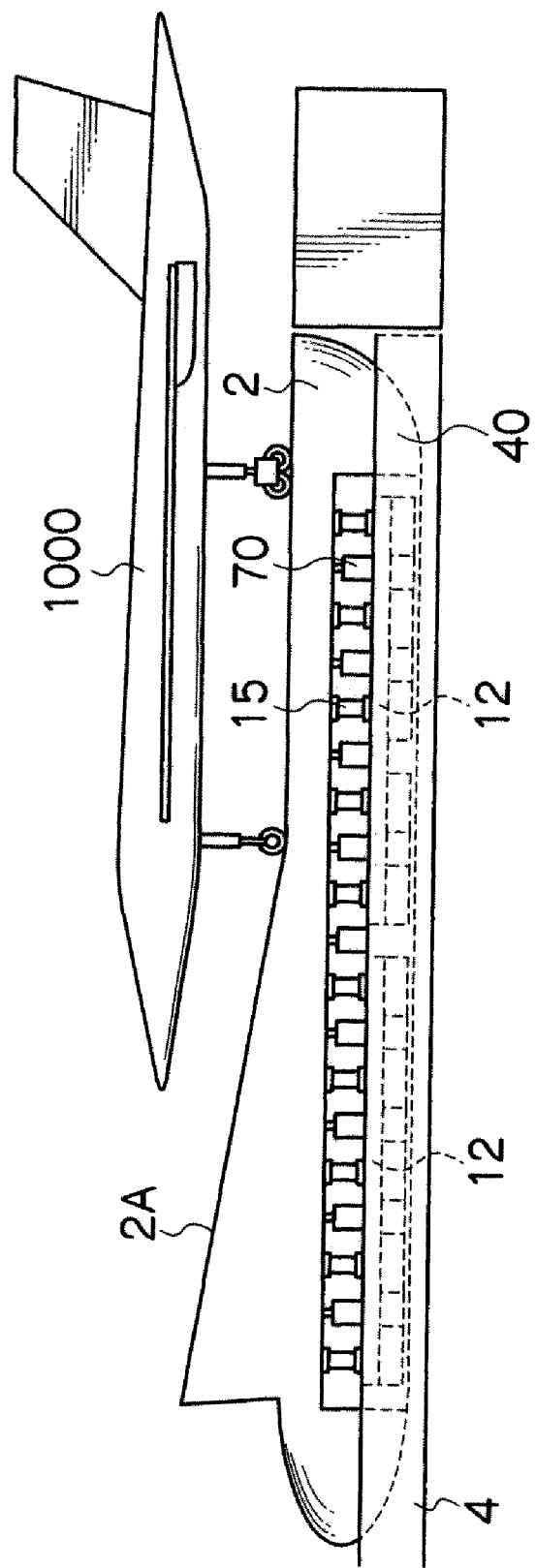
FIG. 8 is an explanatory view showing the supersonic passenger plane being loaded at the support base of the accelerating device shown in FIG. 1.

Firstly, as shown in FIG. 8, the supersonic passenger plane 1000 is taken up onto the passenger plane loading portion 2A of the support base 2. At the time of loading, the front strut stopper 6, main strut stoppers 8 and main strut front stopper 10 are preferably kept withdrawn. The supersonic passenger plane 1000 may be taken up by appropriate means such as a winch or the like, or may propel itself by the engine thrust thereof, or may be towed by a towing vehicle and taken up.

Further, at the time of loading, so that the support base 2 does not warp and excessive loads do not act on the carriages 12, numerous jacks 70, for example, nine at one side, eighteen at both sides in the example of FIG. 8, are interposed between the guide walls 40 and the support base 2, and support the support base 2 from below. Here, the jacks 70 correspond to the support means of the present invention.

Figure 9:
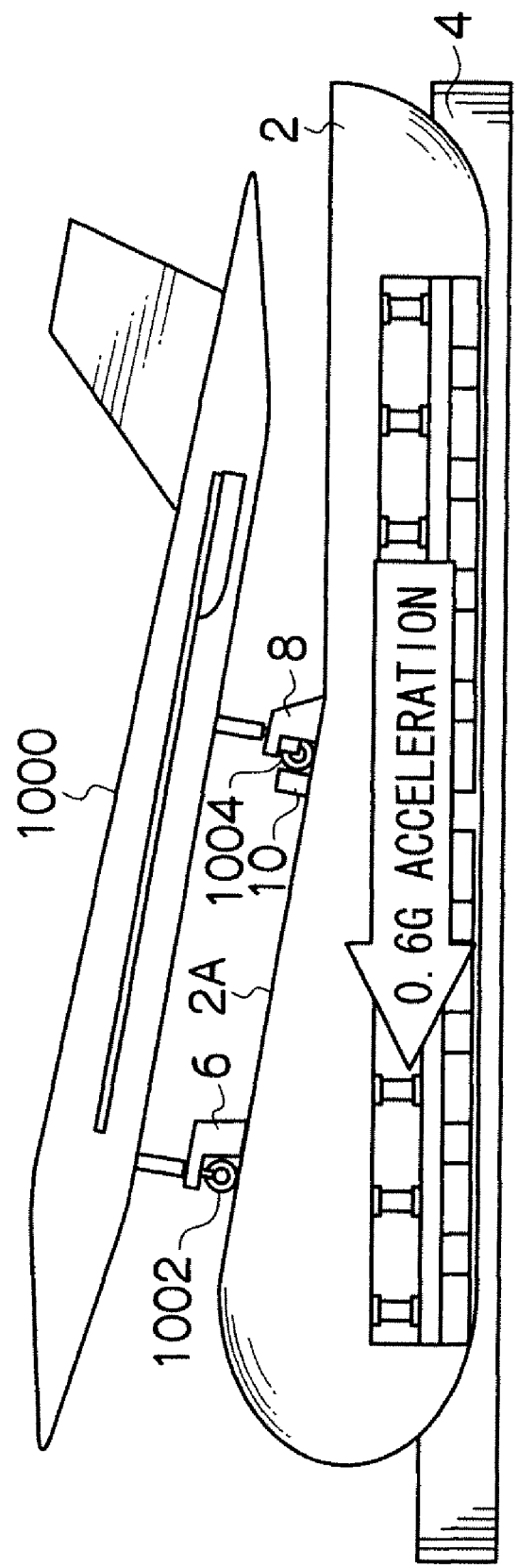
FIG. 9 is an explanatory view showing the supersonic passenger plane having been fixed to the support base and acceleration has started.

When the supersonic passenger plane 1000 has been taken up to a predetermined position, as shown in FIG. 9, the front strut stopper 6 and the main strut stoppers 8 are raised. Then the supersonic passenger plane 1000 is retreated slightly, and the front wheel 1002 and main wheels 1004 fit into the front strut stopper 6 and main strut stoppers 8, respectively. When the main wheels 1004 have fitted into the main strut stoppers 8, the main strut front stoppers 10 are raised, and the main wheels 1004 are restrained from the forward side.

Figure 10:
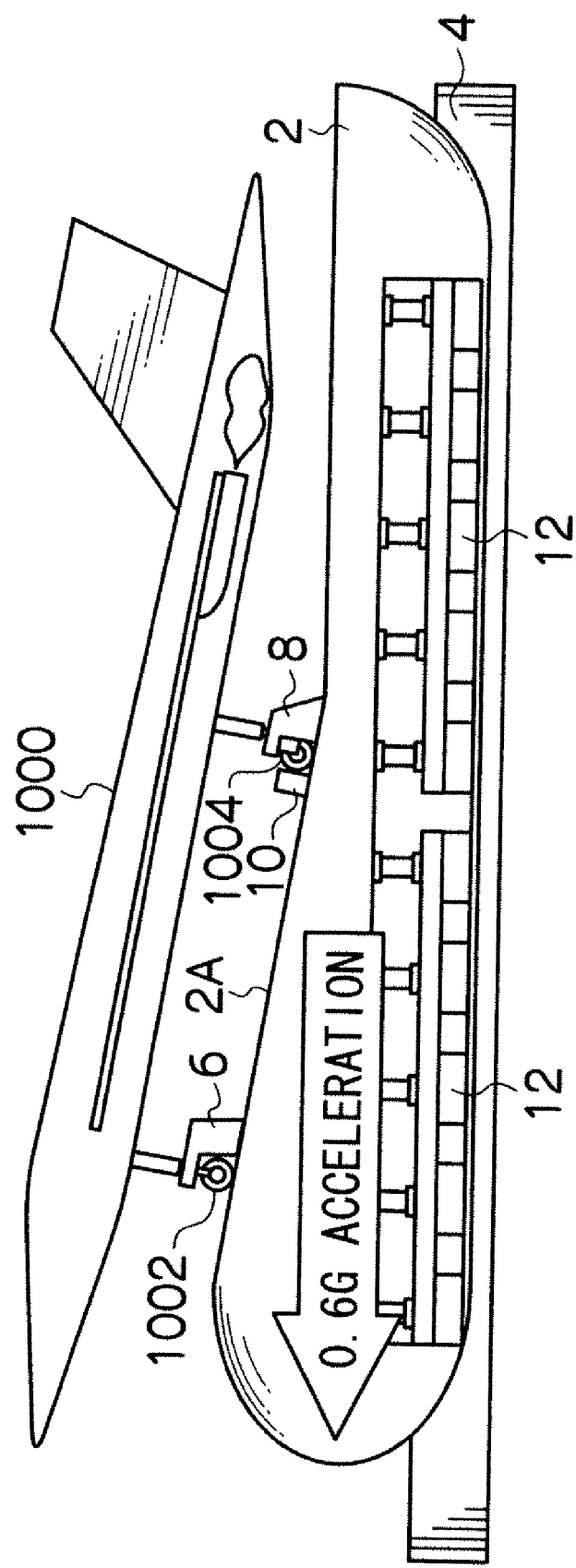
FIG. 10 is an explanatory view showing the engines of the supersonic passenger plane being at full power in the state shown in FIG. 9.
Figure 14:
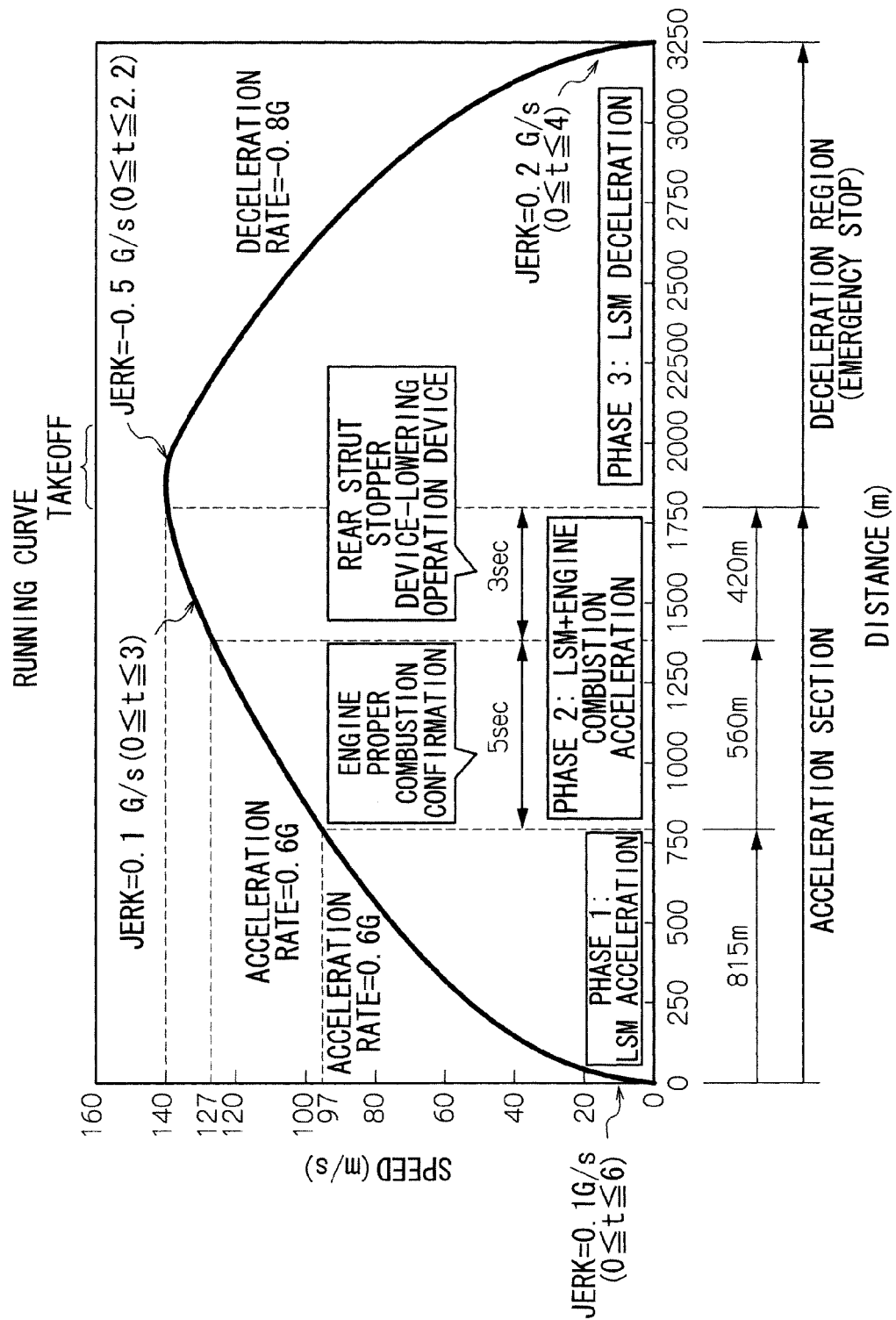
FIG. 14 is a running curve of the support base.

When the supersonic passenger plane 1000 has been restrained at the support base 2, electricity is supplied to the driving coils 41 at the four guide ways 4 by the converters 50 and, as shown in FIG. 9 and FIG. 14, acceleration begins. An acceleration rate at this time can be set at, for example, 0.6 G. However, if shorter distance takeoff is required, the acceleration rate can be set at an acceleration greater than 0.6 G, whereas in a case in which it is desired that passengers be not subjected to discomfort caused by a rapid acceleration, the acceleration rate can be set at an acceleration smaller than 0.6 G. The engines of the supersonic passenger plane 1000 may be started before starting acceleration. However, as shown in FIG. 9, the engines may be kept stopped before starting acceleration and started after the beginning of acceleration. FIG. 10 shows the engines of the supersonic passenger plane 1000 being at full power. When the engines are at full power, the supersonic passenger plane 1000 receives force from the engine thrust so as move forward on the support base 2. However, because the main wheels 1004 are restrained by the main strut front stoppers 10 at the forward side, the acceleration at 0.6 G continues in a state in which the supersonic passenger plane 1000 is integral with the support base 2. Hence, if it is confirmed that the engines are in full power states, the acceleration continues as shown in FIG. 10. On the other hand, at the time of engine stall, the acceleration is halted and the support base 2 is stopped.

Figure 11:
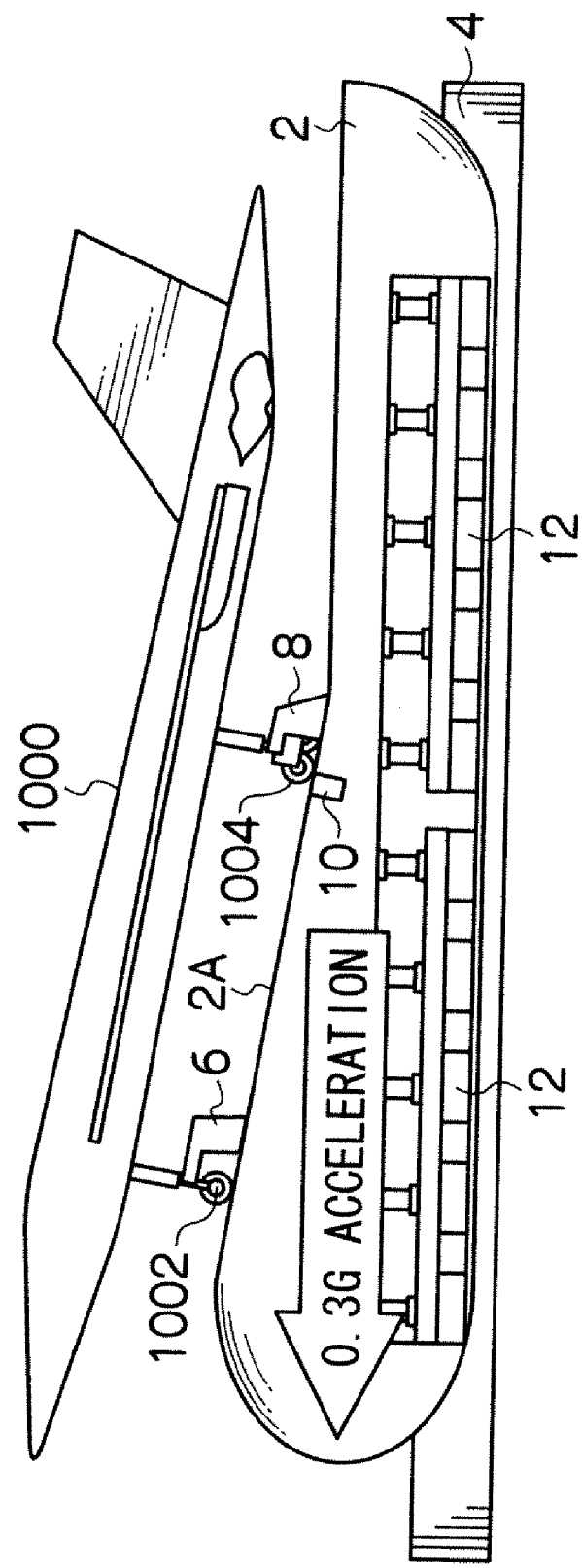
FIG. 11 is an explanatory view showing a main strut front stopper provided at the support base having been withdrawn and forward restraint of the supersonic passenger plane having been released.
Figure 12:
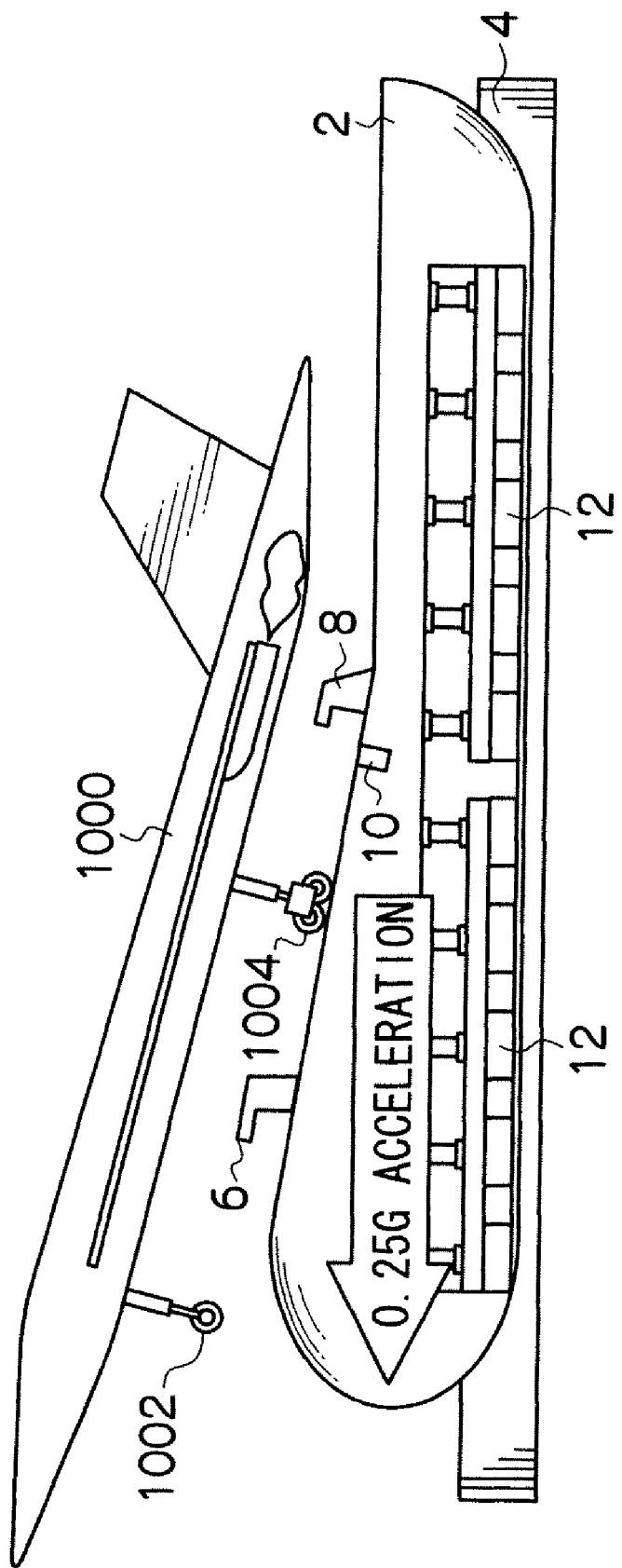
FIG. 12 is an explanatory view showing the supersonic passenger plane separating from the support base.

When the supersonic passenger plane 1000 approaches a predetermined takeoff speed, the acceleration rate of the support base 2 is lowered and, at the same time, the main strut front stoppers 10 are withdrawn as shown in FIG. 14 and FIG. 11. The restraint of the front side of the supersonic passenger plane 1000 is released by the withdrawal of the main strut front stoppers 10. Therefore, the supersonic passenger plane 1000 moves forward on the support base 2 due to the thrust of the engines that are in full-power operation and, as shown in FIG. 11 and FIG. 12, the supersonic passenger plane 1000 separates forward from the support base 2, takes off, and ascends.

Figure 13:
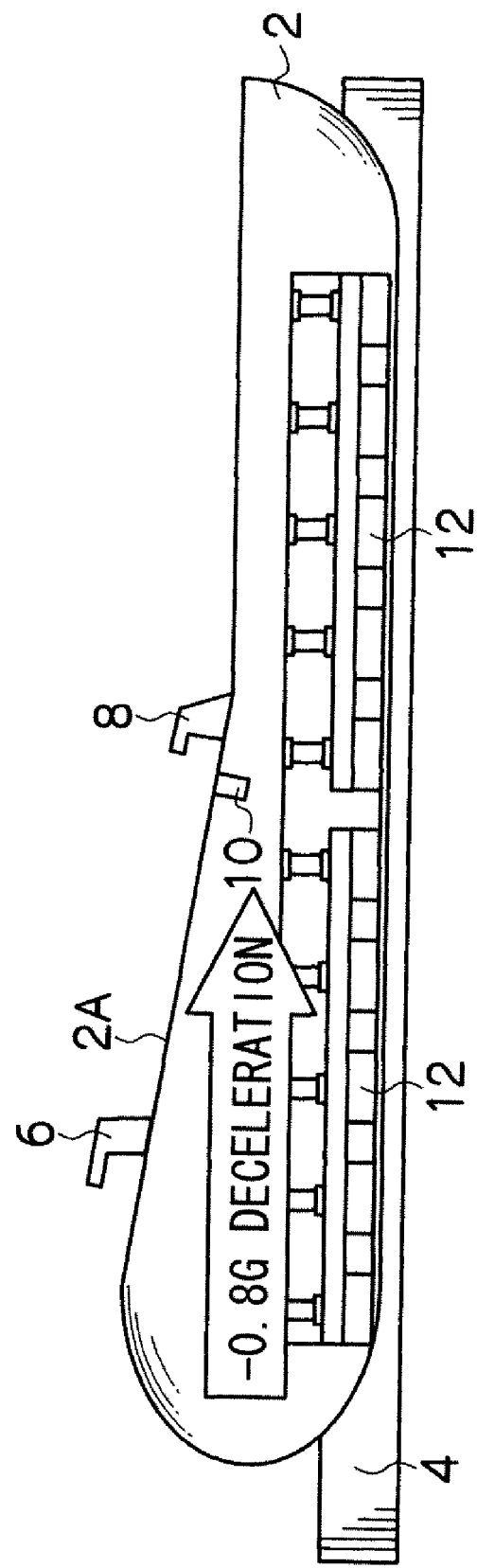
FIG. 13 is an explanatory view showing the support base being decelerating after the supersonic passenger plane has separated.

When the supersonic passenger plane 1000 has separated from the support base 2, as shown in FIG. 13, the support base 2 is decelerated with a high deceleration rate of, for example, around −0.8 G.

Figure 15:
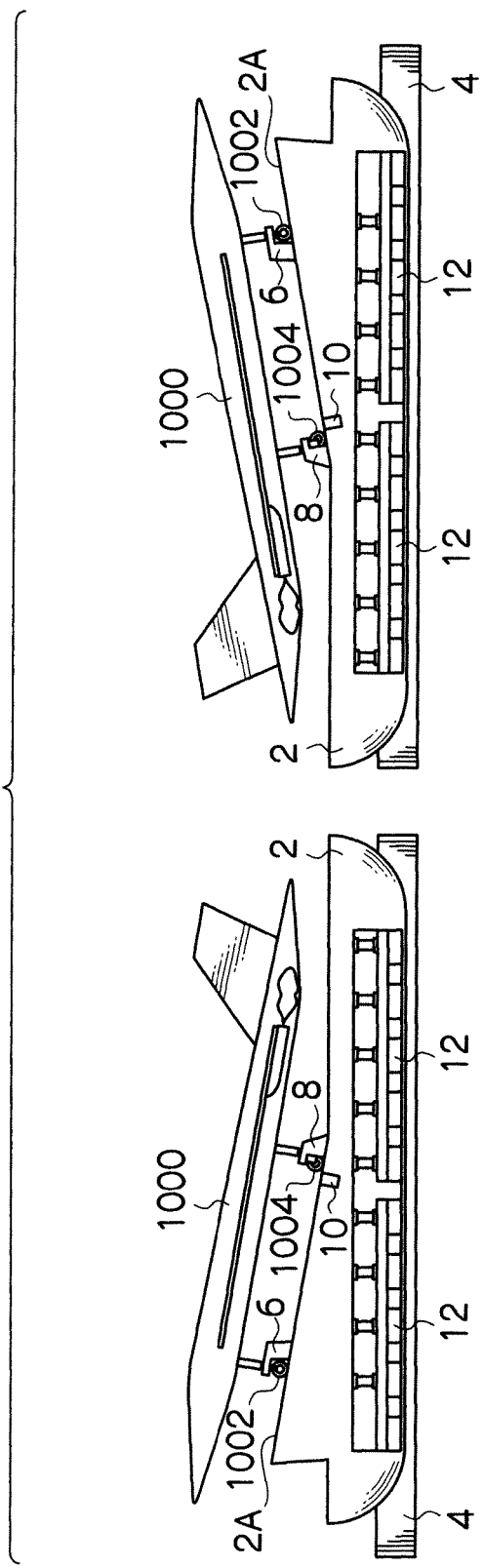
FIG. 15 is side views showing a different example of the accelerating device relating to the first embodiment.

Here, as shown in FIG. 15, for example, two of the support bases 2 are provided at the accelerating device 100 so as to be mutually back to back, and run in a direction opposite to each other. Thus, the accelerating device 100 can be constituted so that acceleration of the supersonic passenger plane 1000 towards two directions is possible. The accelerating device 100 of the above embodiment has an advantage in that the acceleration direction of the supersonic passenger plane 1000 can be selected from the two directions in accordance with a wind direction. Further, instead of providing two support bases, for example, the left half of the support base 2 may serve as the passenger plane loading portion 2A when the supersonic passenger plane 1000 is accelerated in the direction of the arrow 'a' of FIG. 1, and the right half of the support base 2 may serve as the passenger plane loading portion 2A when accelerating in the direction opposite to the arrow 'a', being inclined so as to rise along the acceleration direction with respect to a horizontal plane.

In the accelerating device 100, the front wheel 1002 and main wheels 1004 of the supersonic passenger plane 1000 are restrained at the rearward side and upper side by the front strut stopper 6 and the main strut stoppers 8. Further, the main wheels 1004 are restrained from the front side by the main strut front stoppers 10. Thus, the supersonic passenger plane 1000 is accelerated without going back, lifting up or pitching on the support base 2. Further, even when the engines are at full power, until reaching the predetermined takeoff speed, the plane body is not separated from the support base 2 by the engine thrust, the plane body and the support base 2 stay integrally retained, and the acceleration can be continued.

Further, because the acceleration is implemented by electromagnetic interaction between the driving coils 41 and the vehicle coils 14, the support base 2 can accelerate while maintaining non-contact between the carriages 12 and the guide ways 4. Further, strong regenerative braking is applied by operating the converters 50 such that a phase angle of current from the driving coils 41 is advanced relative to a phase angle of power supplied from the converters 50. Therefore, if some malfunction occurs at the supersonic passenger plane 1000 during acceleration and takeoff becomes impossible, stopping of the support base 2 can be implemented very easily without the supersonic passenger plane 1000 separating from the support base 2. Therefore, safety thereof is very high.

Moreover, because the carriages 12 levitate from the guide ways and caused to run by repulsion forces caused by interaction between the levitating guide coils 43 provided at the guide walls 40 and the vehicle coils 14 at the carriage 12 side, the levitating height is high, and running is stable.

In addition, if one of the vehicle coils 14 at one side quenches, as shown in FIG. 16, an unbalancing force is generated in a direction toward the guide wall 40 at the side that opposes the side face of the side of the carriage frame 13 at which the vehicle coil 14 has quenched. However, because five vehicle coils 14 are provided in each side of the carriage frame 13, even when one thereof quenches, no particularly great yawing direction force will act on the carriage 12 itself, and the acceleration can be continued stably.

Moreover, at each of the guide ways 4, electricity is supplied by the four converters 50. Therefore, because the guide ways 4 are divided into short sections, even if one of the converters 50 fails, the acceleration can be continued.

Moreover again, at the converters 50, surplus electricity from the driving coils 41 is recovered by rotation of the flywheels 52 by the generator motors 51, and is utilized at a subsequent time of acceleration. Thus, peak loads can be reduced and, further, huge expansion of the capacity of the power-receiving equipment 60 is unnecessary.

INDUSTRIAL APPLICABILITY

The accelerating device of the present invention can be employed not only for assisting takeoff of supersonic passenger planes but also for takeoff assistance of subsonic passenger planes.

EXPLANATION OF REFERENCE NUMERALS

2 Support base
2A Passenger plane loading portion
4 Guide way
6 Front strut stopper
8 Main strut stopper
10 Main strut front stopper
12 Carriage
13 Carriage frame
14 Vehicle coil
15 Pneumatic spring
16 Tire wheel
17 Stopper
18 Stopper
40 Guide wall
41 Driving coil
42 Running path
43 Levitating guide coil
44 Slab portion
45 Cover
50 Converter
50A Converter
50B Converter
50C Converter
50D Converter
51 Generator motor
52 Flywheel
60 Power-receiving equipment
70 Jack
100 Accelerating device
1000 Supersonic passenger plane
1002 Front wheel
1004 Main wheel

The invention claimed is:

1. An accelerating device that accelerates an aircraft so as to cause the aircraft to take off, the accelerating device comprising:
   a support base that supports the aircraft so as not to let the aircraft go backward, levitate or pitch during acceleration;
   a guide way provided along a predetermined path;
   guide means that guides the support base along the guide way;
   drive means that drives the support base along the guide way;
   a front strut stopper restraining a front wheel of the aircraft from a rearward side and restraining the front wheel from an upper side;
   main strut stoppers restraining main wheels of the aircraft from a rearward side and restraining the wheels from an upper side; and main strut front stoppers provided in front of the main strut stoppers and restraining the main wheels from a forward side, wherein the front strut stopper, the main strut stoppers, and the main strut front stoppers are disposed so as to be retractable into the support base.

2. The accelerating device of claim 1, wherein the guide means is levitating guide coils disposed on the ground, and the drive means is a linear motor.

3. The accelerating device described in claim 2, wherein a plurality of the guide ways are provided in parallel with one another, and the guide means supports the support base across the plurality of the guide ways.

4. The accelerating device of claim 3, wherein the drive means brakes the support base by electric braking.

5. The accelerating device described in claim 2, wherein the drive means brakes the support base by electric braking.

6. The accelerating device of claim 5, wherein each drive means includes at least two converters that supply electricity.

7. The accelerating device of claim 6, further comprising an electricity absorption device that absorbs electricity generated during electric braking at the drive means.

8. The accelerating device of claim 7, wherein the electricity absorption device is a flywheel.

9. The accelerating device of claim 8, wherein the flywheel is employed as the electricity storage device.

10. The accelerating device of claim 6, further comprising an electricity storage device that stores electricity for driving the drive means in advance.

11. The accelerating device of claim 7, further comprising an electricity storage device that stores electricity for driving the drive means in advance.

12. The accelerating device described in claim 1, wherein the aircraft is separated from the support base at a predetermined angle of attack.

13. The accelerating device described in claim 1, wherein the aircraft is separated from the support base horizontally.

14. The accelerating device described in claim 1, wherein the support base accelerates the aircraft and causes the aircraft to take off in one direction along the guide way or in another direction opposite to the one direction.

15. The accelerating device described in claim 1, further comprising a support means that supports the support base from below while the aircraft is being loaded on the support base.

\* \* \* \* \*